United States Patent
Wang et al.

(10) Patent No.: US 9,605,660 B2
(45) Date of Patent: Mar. 28, 2017

(54) APPARATUS FOR HEATING WORKING FLUID OF GAS TURBINE-SOLAR POWER GENERATION SYSTEM

(75) Inventors: Shuhui Wang, Xiangtan (CN); Minhui Wang, Xiangtan (CN); Yuelei Zhang, Xiangtan (CN); Bugen Wang, Xiangtan (CN); Shuai Liu, Xiangtan (CN); Xinhua Tan, Xiangtan (CN); Yufen Tang, Xiangtan (CN)

(73) Assignees: Xiangtan Liyuan Electric Tooling Co., Ltd. (CN); Xiangtan Electric Manufacturing Co., Ltd. (CN)

( * ) Notice: Subject to any disclaimer, the term of this patent is extended or adjusted under 35 U.S.C. 154(b) by 390 days.

(21) Appl. No.: 14/115,985

(22) PCT Filed: Apr. 27, 2012

(86) PCT No.: PCT/CN2012/074835
§ 371 (c)(1),
(2), (4) Date: Nov. 6, 2013

(87) PCT Pub. No.: WO2012/152194
PCT Pub. Date: Nov. 15, 2012

(65) Prior Publication Data
US 2014/0075940 A1 Mar. 20, 2014

(30) Foreign Application Priority Data

May 6, 2011 (CN) .......................... 2011 1 0117644
May 6, 2011 (CN) .................... 2011 2 0143218 U (51) Int. Cl.
*F03G 6/04* (2006.01)
*F02C 1/05* (2006.01)
(Continued)

(52) U.S. Cl.
CPC .................. *F03G 6/04* (2013.01); *F02C 1/05* (2013.01); *F03G 6/064* (2013.01); *F23D 14/24* (2013.01);
(Continued)

(58) Field of Classification Search
CPC .. F03G 6/064; F03G 6/04; F24J 2/0023; F24J 2/05; F24J 2/07; F24J 2/28;
(Continued)

(56) References Cited

U.S. PATENT DOCUMENTS 1,731,722 A * 10/1929 Meier ..................... F23D 14/24
                                                                    239/404
2,850,875 A *  9/1958 Gahwyler .............. D06M 11/38
                                                                    431/351
(Continued)

FOREIGN PATENT DOCUMENTS

AE    WO 2011077248 A2 *  6/2011 ............... F01K 3/12
CN        101865097 A     10/2010
(Continued)

OTHER PUBLICATIONS

International Search Report for Application No. PCT/CN2012/074835 dated Jun. 28, 2012.
(Continued)

*Primary Examiner* — Thomas Denion
*Assistant Examiner* — Xiaoting Hu
(74) *Attorney, Agent, or Firm* — Lerner, David, Littenberg, Krumholz & Mentlik, LLP (57) ABSTRACT

An apparatus for heating a working fluid of a gas turbine-solar power generation system, comprising, sequentially connected, a cold air flow channel, a heat collecting cavity, and a hot air passage. The hot air passage is formed by connecting an inner housing on the front side to a supplemental heating section on the rear side. Also comprised is a
(Continued)

burner for heating a primary heating air within the supplemental heating section when having insufficient solar power, and the burner is arranged at the supplemental heating section.

20 Claims, 6 Drawing Sheets

(51) Int. Cl.
    *F24J 2/48*     (2006.01)
    *F24J 2/46*     (2006.01)
    *F24J 2/28*     (2006.01)
    *F24J 2/00*     (2014.01)
    *F24J 2/07*     (2006.01)
    *F23D 14/24*     (2006.01)
    *F03G 6/06*     (2006.01)

(52) U.S. Cl.
    CPC .............. *F24J 2/0023* (2013.01); *F24J 2/07* (2013.01); *F24J 2/28* (2013.01); *F24J 2/46* (2013.01); *F24J 2/4625* (2013.01); *F24J 2/484* (2013.01); *Y02E 10/41* (2013.01); *Y02E 10/46* (2013.01)

(58) Field of Classification Search
    CPC .... F24J 2/4625; F24J 2/484; F24J 2/46; F24J 2/0488; F24J 2/0494; F24J 2002/503; F24J 2/4607; F23D 14/24; F23D 14/58; F23D 14/62; F23D 14/70; F23R 3/12; F02C 1/05
    See application file for complete search history.

(56) References Cited

U.S. PATENT DOCUMENTS

| | | | | |
|---|---|---|---|---|
| 4,167,856 A | * | 9/1979 | Seidel | F03G 6/064 60/641.14 |
| 4,189,922 A | * | 2/1980 | Bellofatto | F02C 1/05 60/641.8 |
| 4,259,836 A | * | 4/1981 | Finckh | F02C 1/05 126/117 |
| 4,403,601 A | * | 9/1983 | Hunt | F02C 1/05 126/643 |
| 4,487,573 A | * | 12/1984 | Gottschlich | F23D 14/24 431/185 |
| 4,509,333 A | * | 4/1985 | Nussdorfer | F02C 1/05 60/203.1 |
| 4,602,614 A | * | 7/1986 | Percival | F03G 6/00 126/609 |
| 4,610,625 A | * | 9/1986 | Bunn | F23C 6/045 431/174 |
| 4,626,195 A | * | 12/1986 | Sato | F23D 14/24 431/12 |
| 4,673,350 A | * | 6/1987 | Collier | F23D 14/24 126/91 A |
| 4,813,867 A | * | 3/1989 | Yoshida | F23C 6/045 126/91 A |
| 4,894,006 A | * | 1/1990 | Cassagne | F23M 11/045 431/116 |
| 5,421,322 A | * | 6/1995 | Karni | B01J 19/122 126/680 |
| 5,448,889 A | | 9/1995 | Bronicki | |
| 5,882,184 A | * | 3/1999 | Feldermann | F23D 14/24 239/424.5 |
| 5,904,138 A | * | 5/1999 | Keintzel | F02C 1/05 126/609 |
| 5,931,158 A | * | 8/1999 | Buck | F24J 2/07 126/648 |
| 5,984,666 A | | 11/1999 | Pillard et al. | |
| 6,099,931 A | * | 8/2000 | Heller | F24J 2/07 126/648 |
| 6,141,949 A | * | 11/2000 | Steinmann | F01K 21/047 60/39.182 |
| 2001/0010896 A1 | * | 8/2001 | Nagayama | F23C 9/006 431/10 |
| 2005/0053877 A1 | * | 3/2005 | Feese | F23C 6/045 431/10 |
| 2012/0096858 A1 | * | 4/2012 | Augenblick | F02C 1/055 60/641.8 |
| 2013/0147197 A1 | * | 6/2013 | Goebel | F01K 3/12 290/52 |
| 2013/0298557 A1 | * | 11/2013 | Treece | F03G 6/06 60/641.15 |
| 2015/0054284 A1 | * | 2/2015 | Nathan | F03G 6/00 290/52 |
| 2016/0003141 A1 | * | 1/2016 | Andersson | F03G 6/064 60/736 |

FOREIGN PATENT DOCUMENTS

| | | | |
|---|---|---|---|
| CN | 101871440 A | 10/2010 | |
| CN | 102128149 A | 7/2011 | |
| CN | 102162433 A | 8/2011 | |
| CN | 102226449 A | 10/2011 | |
| CN | 202056013 U | 11/2011 | |
| DE | 3504360 A1 * | 8/1986 | ............... F02C 1/05 |
| FR | 2531753 A1 | 2/1984 | |

OTHER PUBLICATIONS

Extended European Search Report for Application No. 12782306.0 dated Jun. 19, 2015.

* cited by examiner

APPARATUS FOR HEATING WORKING FLUID OF GAS TURBINE-SOLAR POWER GENERATION SYSTEM

CROSS-REFERENCE TO RELATED APPLICATIONS

The present application is a national phase entry under 35 U.S.C. §371 of International Application No. PCT/CN2012/074835 filed Apr. 4, 2012, which claims priority from CN 201110117644.5 filed May 6, 2011 and CN 201120143218.4 filed May 6, 2011, all of which are hereby incorporated herein by reference.

FIELD OF THE INVENTION

The present invention relates to the field of solar-thermal power generation technologies, in particular to an apparatus for heating a working fluid of a gas turbine-solar power generation system.

DESCRIPTION OF THE PRIOR ART

Solar power is one of the new energies with the most promising future and most possibility to meet the increasingly high energy demand by future social development. It is characterized by unlimited reserves, universal distribution, clean utility and economical efficiency. Solar-thermal power generation is characterized by good adaptability to the grid load, high photovoltaic conversion efficiency, easiness to achieve scale effect, more environmentally friendly production processes of supplies and better power adjustability, which is an important direction of development of solar power generation in the future.

Depending on various ways of light concentration, the solar-thermal power generation mainly comprises several power generation systems in the shape of slot, tower and dish, wherein the dish-type solar power generation system is also referred to as the disk-type system. Its main characteristic includes the employment of a disk-shaped concentrating collector with a parabolic surface. Its concentrating ratio can reach up to hundreds or thousands of times, thereby capable of generating a very high temperature; relative to other ways, the dish-type solar power generation system has major advantages such as the capability of flexible modular arrangement, higher concentrating ratio and higher total power generation efficiency, and consequently has attracted increasing attention. Meanwhile, the power generation system may employ heat engines of different principles, such as steam turbine, gas turbine and Stirling engine.

Gas turbine is a rotary power generating machine that uses a continuously flowing gas as the working fluid and converts thermal energy to mechanical work, mainly comprising an air compressor, a working fluid heating apparatus, a turbine, a control system and auxiliary equipment. Its working principle is: when the air is compressed in the air compressor, it absorbs heat in the heating apparatus and its temperature rises, and then it enters the turbine to expand to work, thereby driving the power generator to generate power.

The role that an apparatus for heating a working fluid plays is to convert solar energy to thermal energy, which is then transmitted to the air. Currently, there are still the following key issues to be addressed: 1) how to solve the problem that when the solar power is not sufficient or stable, e.g. during a rainy day, no solar power or insufficient solar power in the morning or evening, temporary shield by cloud, etc., the power generation system is consequently not stable in running, so as to improve the stability and adjustability of the current outputted by the power generation system; 2) how to make solar energy efficiently absorbed by heat absorbing parts and converted to thermal energy, and rapidly and efficiently transfer the thermal energy to the working fluid (the air).

In light of the above issues, it is urgent to improve the structure of existing apparatuses for heating working fluids of gas turbine-solar power generation systems, such that they can combine the use of solar power and other gaseous fuels according to the direction radiation of solar power, thereby maintaining the stability and adjustability of the current outputted by the power generation system

SUMMARY OF THE INVENTION

The technical problem that the present invention intends to solve is to provide an apparatus for heating a working fluid of a gas turbine-solar power generation system, which can combine the use of solar power and other gaseous fuels according to the direction radiation of solar power, thereby maintaining the stability and adjustability of the current outputted by the power generation system.

To solve the above technical problem, the present invention provides an apparatus for heating a working fluid of a gas turbine-solar power generation system, comprising a cold air flow channel, a heat collecting cavity, and a hot air passage that are sequentially connected, the hot air passage is formed by connecting an inner housing on the front side to a supplemental heating section on the rear side; further comprising a gas burner for heating a primary heating air within the supplemental heating section when solar power is insufficient, and the burner is arranged at the supplemental heating section.

Preferably, the burner head of the burner is fitted with a swirl nozzle, the swirl nozzle is equipped externally with a guide sleeve, the burner head, the swirl nozzle and the guide sleeve form an inner cavity, the burner housing and the guide sleeve form a secondary air passage, and the secondary air passage and the inner cavity are open to the hot air passage; the burner is further equipped with an air introduction pipe that is open to the secondary air passage and the inner cavity.

Preferably, the air introduction pipe is equipped with dividing holes, and the air introduction pipe is open to the secondary air passage and the inner cavity via the dividing holes.

Preferably, an end plate is disposed at the fuel outlet of the burner head, at least 3 fuel jet pipes bending outwardly and an ignition pipe are disposed on the end plate, and the ignition pipe extends to the ignition plug of the burner.

Preferably, the swirl nozzle has a structure that a plurality of guide holes are evenly arranged therein, and the axes of the guide holes and the axis of the swirl nozzle are straight lines on different planes.

Preferably, the collecting cavity is formed by a glass cover, a primary heat absorbing body and a secondary heat absorbing body, and the primary heat absorbing body has a thickness that gradually increases from the center to two sides.

Preferably, a cooling jacket is disposed at the front side of the front end plate, the cooling jacket is equipped with a cooling liquid flowing cavity, and a first connector and a second connector for the cooling liquid to flow in and out are disposed on the two sides of the cooling liquid flowing cavity, respectively.

Preferably, the burner is fixedly connected to the supplemental heating section.

Preferably, the burner and the supplemental heating section are in a detachable structure, in which the two are detachably connected.

The apparatus for heating a working fluid of a gas turbine-solar power generation system provided by the present invention comprises a gas burner for heating a primary heating air within the supplemental heating section when solar power is insufficient, and the burner is arranged at the supplemental heating section of the apparatus for heating a working fluid.

With the above structure, during the operations, the cold air (having a high temperature relative to the normal temperature air) from the upstream air compressor enters the ring-shaped cold air passage via the cold air feeding pipe, and then changes to a radial flow at the rear end of the front end plate to enter the secondary heat absorbing body, it absorbs heat in the secondary heat absorbing body and subsequently enters the collecting cavity to absorb heat again, becomes the primary heating air to enter the hot air passage, and then enters the supplemental heating section after the first temperature sensor disposed at the front end of the supplemental heating section detects its temperature. If its temperature reaches the design value, the primary heating air enters the high temperature air discharge pipe and is introduced into the downstream gas turbine to do work; if its temperature does not reach the design value, the burner is turned on to further heat the above primary heating air until it meets the requirement by the second temperature sensor, which will be then transported to the downstream via the high temperature air discharge pipe.

It can be seen from the above operation process that when the sky is clear and there is sufficient solar power, the above apparatus for heating a working fluid can work on solar power only; when there is insufficient solar power, it can work with solar power and gas simultaneously; before the sun rises or after the sun sets, or when there is no direct sunlight to the ground during overcast and rainy days, the cold air input can be suspended, while the system's power generation can be maintained only through the operation of the burner.

Therefore, the apparatus for heating a working fluid with the above structure can combine the use of solar power and other gaseous fuels according to the direction radiation of solar power, providing supplemental burning to the primary heating air at the supplemental heating section when there is insufficient solar power. Thanks to the simple structure and relatively low manufacturing cost of the burner, the apparatus for heating a working fluid can, under low cost, maintain the stability and adjustability of the current outputted by the power generation system even when the solar power is insufficient.

In another specific embodiment, the above primary heat absorbing body can have a thickness that gradually increases from the center to two sides. According to the distribution density of the concentrated solar energy by the disk-shaped concentrating collector, it can be seen that for the primary heat absorbing body, the energy density is the highest at its central part, which gradually decreases along with the increasing radius. With the mechanism that the primary heat absorbing body is designed to have a thickness smaller at the center than the two sides, the concentrated sunlight has the shortest flow path in the central part, the smallest pressure loss, the highest infiltration rate, the highest heat convection coefficient, and better coordination with the solar energy distribution density, thereby achieving the best absorption effect.

Wherein the corresponding relationship between the legends in FIG. 1 to FIG. 9 and the part names is:

| 1 cooling liquid | 2 second connector | 3 cooling jacket |
|---|---|---|
| 4 cooling liquid flowing cavity | 5 cold air flow channel | |
| 6 front section of the housing | | |
| 7 heat collecting cavity | 8 external insulation layer | 9 rear section of the housing |
| 10 internal insulation layer | 11 first fastening assembly | |
| 12 first temperature sensor | | |
| 13 supplemental heating section | 14 insulation layer | 15 high temperature air discharge pipe |
| 16 second temperature sensor | 17 hot air | 18 air for supplemental burning |
| 19 third temperature sensor | 20 burner | 21 fuel feeding pipe |
| 22 fuel | 23 cold air feeding pipe | 24 fourth temperature sensor |
| 25 cold air | 26 hot air passage | 27 primary heating air |
| 28 inner housing | 29 primary heat absorbing body | 30 heat absorbing body installation support |
| 31 second fastening assembly | 32 glass cover | 33 secondary heat absorbing body |
| 34 first connector | 35 front end plate | 36 sealing member |

| | | |
|---|---|---|
| 37 collected sunlight | 38 burner housing | 39 guide sleeve |
| 40 swirl nozzle | 41 burner head | 42 fire arrestor |
| 43 secondary air passage | 44 ignition plug | 45 air introduction pipe |
| 46 dividing hole | 47 airflow guide blade | 48 guide hole |
| 49 fuel jet pipe | 50 ignition pipe | |

DETAILED DESCRIPTION OF THE PREFERRED EMBODIMENTS

The core of the present invention is to provide an apparatus for heating a working fluid of a gas turbine-solar power generation system, which can combine the use of solar power and other gaseous fuels according to the direction radiation of solar power, and can maintain the stability and adjustability of the current outputted by the power generation system even when the solar power is insufficient.

To make those skilled in the art better understand the technical solution of the present invention, the present invention will be further described in detail below with reference to the accompanying drawings and embodiments and with an apparatus for heating a working fluid of a disk-type gas turbine-solar power generation system as example.

Figure 1:
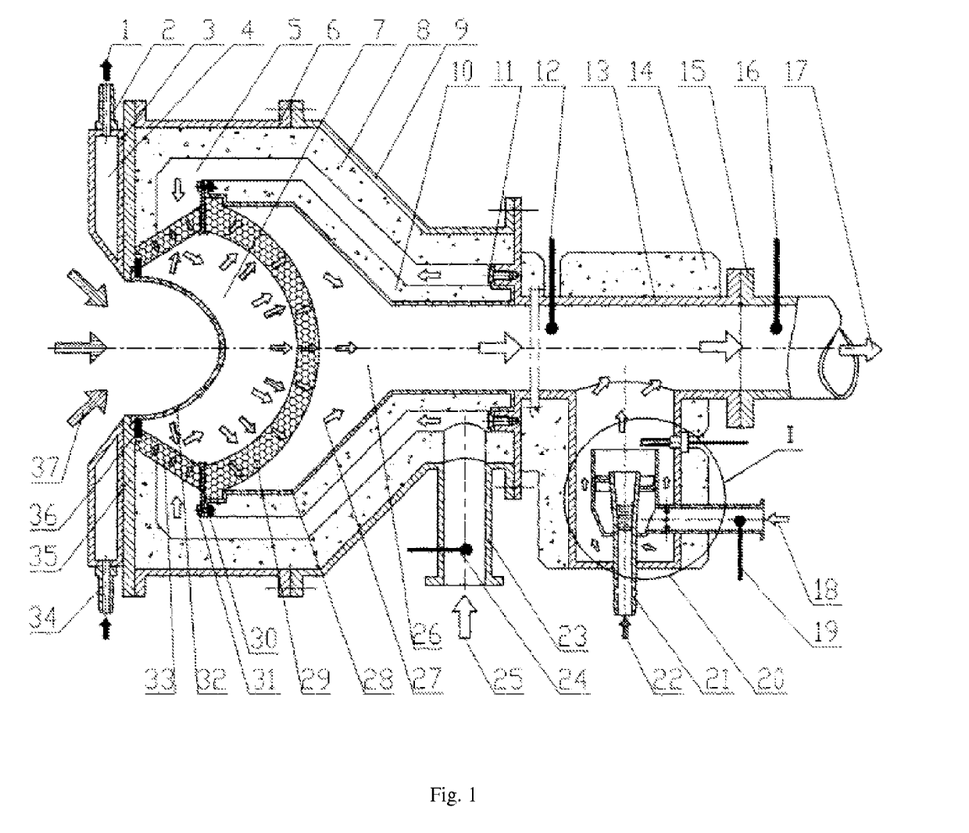
FIG. 1 illustrates the structure of one embodiment of the apparatus for heating a working fluid of a gas turbine-solar power generation system according to the present invention.

Please refer to FIG. 1. FIG. 1 illustrates the structure of one embodiment of the apparatus for heating a working fluid of a gas turbine-solar power generation system according to the present invention.

In an embodiment as shown in FIG. 1, the apparatus for heating a working fluid of a gas turbine-solar power generation system according to the present invention comprises a front section of the housing 6, a rear section of the housing 9, and a supplemental heating section 13, and the three connect to a coaxial integral whole; the front side of the front section of the housing 6 is connected to the front end plate 35 opened with a light collection hole via a flange, the inner side of the front end plate 35 is disposed with the glass cover 32, the glass cover 32 is connected to the heat absorbing body installation support 30 via the second fastening assembly 31, the ring-shaped secondary heat absorbing body 33 is disposed between the heat absorbing body installation support 30 and the front end plate 35, the primary heat absorbing body 29 is disposed between the heat absorbing body installation support 30 and the inner housing 28, the glass cover 32, the primary heat absorbing body 29 and the secondary heat absorbing body 33 jointly form the heat collecting cavity 7, and the sealing member 36 is further disposed between the front end plate 35 and the glass cover 32; the external insulation layer 8 is disposed on the inner wall of the front section of the housing 6, the rear section of the housing 9 and the front end plate 35, the inner housing 28 of the apparatus for heating a working fluid is coaxially installed on the boss on the external side of the flange at the front end of the supplemental heating section 13, and the two form the hot air passage 26, and the insulation layer 14 is disposed on the external side of the supplemental heating section 13; the internal insulation layer 10 is disposed on the external side of the inner housing 28, and the ring-shaped cold air flow channel 5 is formed between the internal insulation layer 10 and the external insulation layer 8; the external side of the above rear section of the housing 9 is further connected to the cold air feeding pipe 23, and the above cold air feeding pipe 23, cold air flow channel 5, heat collecting cavity 7 and hot air passage 26 are connected sequentially; the above supplemental heating section 13 is further disposed with the gas burner 20, and the burner 20 can heat the primary heating air 27 in the supplemental heating section 13 when the solar power is not sufficient.

With the above structure, during the operations, the cold air 25 (having a high temperature relative to the normal temperature air) from the upstream air compressor enters the ring-shaped cold air passage 5 via the cold air feeding pipe 23, and then changes to a radial flow at the rear end of the front end plate 35 to enter the secondary heat absorbing body 33, it absorbs heat in the secondary heat absorbing body 33 and subsequently enters the collecting cavity 7 to absorb heat, becomes the primary heating air 27 to enter the hot air passage 26, and then enters the supplemental heating section 13 after the first temperature sensor 12 disposed at the front end of the supplemental heating section 13 detects its temperature. If its temperature reaches the design value, the primary heating air 27 enters the high temperature air discharge pipe 15 and is introduced into the downstream gas turbine to do work; if its temperature does not reach the design value, the gas burner 20 is turned on to further heat the above primary heating air 27 until it meets the requirement by the second temperature sensor 16, which will be then transported to the downstream via the high temperature air discharge pipe 15.

It can be seen from the above operation process that when the sky is clear and there is sufficient solar power, the above apparatus for heating a working fluid can work on solar power only; when there is insufficient solar power, it can work with solar power and gas simultaneously; before the sun rises or after the sun sets, or when there is no direct sunlight to the ground during overcast and rainy days, the input of the cold air 25 can be suspended, while the system's power generation can be maintained only through the operation of the burner 20.

Therefore, the apparatus for heating a working fluid with the above structure can combine the use of solar power and other gaseous fuels according to the direction radiation of solar power, providing supplemental burning to the primary heating air 27 at the supplemental heating section when there is insufficient solar power. Thanks to the simple structure and relatively low manufacturing cost of the burner, the apparatus for heating a working fluid can, under low cost, maintain the stability and adjustability of the current outputted by the power generation system even when the solar power is insufficient.

It should be noted that the above embodiment does not limit the specific structure of the gas burner 20, nor does it limit the specific connection between the burner 20 and the supplemental heating section 13. In fact, any apparatus for heating a working fluid that is disposed with a gas burner 20 at the supplemental heating section 13 and can provide supplemental heating through gas burning to the primary heating air 27 in the supplemental heating section 13 shall be encompassed by the present invention.

In addition, the position term "front" in the above embodiment refers to the direction from right to left in FIG. 1, "rear" refers to the direction from left to right in FIG. 1, and it should be understood that these position terms are based on figures in the Description, the presence of which should not affect the protection scope of the present invention.

It should be particularly noted that gaseous fuels used by the above burner may not only be mid to high grade petrochemical fuels, such as natural gas, liquefied petroleum gas, coal bed gas, coke oven gas, etc., but also be low grade renewable fuels, such as methane, landfill gas, biomass gas, etc. As a result, the present invention can combine solar power with other fuels in use, which greatly expands the range of used energy sources, increases the extensiveness of solar power generation systems, and is very beneficial for solving the power supply problem in remote areas, such as rural areas in China.

The above glass cover 32 may be designed to have a semispherical or semi-ellipsoidal structure such that even there are relatively high pressure and temperature in the heat collecting cavity 7, the glass cover 32 can still be better protected from being pressurized to crack or from thermal stress damage. Of course, the above glass cover 32 may also be designed to other shapes.

The specific structural form of the above burner 20 may also be further set up.

Figure 2:
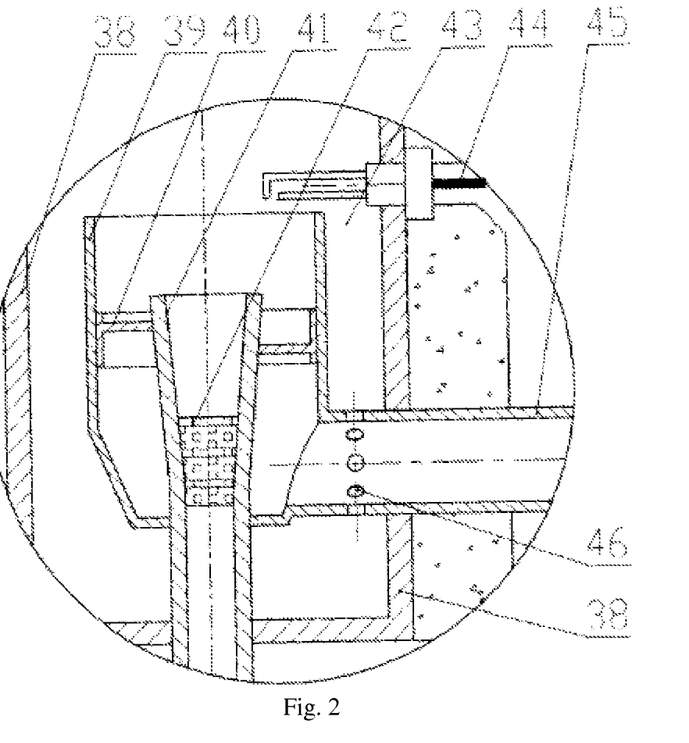
FIG. 2 is a partially enlarged view of Position I of FIG. 1.

Please refer to FIG. 2. FIG. 2 is a partially enlarged view of Position I of FIG. 1.

In an embodiment as shown in FIG. 2, the burner head 41 of the above burner 20 is fitted with a swirl nozzle 40, the swirl nozzle 40 is equipped externally with a guide sleeve 39, the burner head 41, the swirl nozzle 40 and the guide sleeve 39 form an inner cavity with the top end open, the burner housing 38 and the guide sleeve 39 form a secondary air passage 43, and the secondary air passage 43 and the above inner cavity are both open to the hot air passage 26; the burner 20 is further equipped with an air introduction pipe 45, and the air introduction pipe 45 is open to the secondary air passage 43 and the inner cavity.

With the above structure, during the operations of the above burner 20, the air for supplemental burning 18 enters the air introduction pipe 45 and is divided into two routes in the air introduction pipe 45: the first route of air enters the inner cavity and flows out through the swirl nozzle 40; at the same time, the gaseous fuel 22 is inputted from the fuel feeding pipe 21, outputted from the burner head 41, and then mixed with the first route of air from the swirl nozzle 40 to form a combustible pre-mixed gas, the ignition plug 44 of the burner 20 is sparked to ignite the pre-mixed gas, and the fuel 22 begins to burn; since the first route of air has a momentum in the tangential direction after flowing out of the swirl nozzle 40, a return flow zone will be formed at the downstream of the burner head 41, a part of the burning high temperature gas returns in the return flow zone to ignite the subsequent combustible mixed gas and keep the burning stable; whether the ignition is successful is determined based on the readings of the second temperature sensor 16 and the first temperature sensor 12. If the ignition is successful, the ignition plug 44 stops sparking, otherwise it continues to spark.

The second route of air enters the secondary air passage 43 via the air introduction pipe 45 and flows along the inner wall of the burner housing 38 as constrained by the guide sleeve 39. This route of air plays two roles: first, it can provide supplemental burning; second, it can isolate the flame that has a very high local temperature from the burner housing 38, resulting in air film cooling to prevent the burner housing 38 from being burned. When the second route of air is fully mixed with the high temperature smoke gas and there is no local high temperature zone that is obviously higher than the allowable temperature for the material, it enters the supplemental heating section 13, mixes with the primary heating air 27, and forms the hot air 17 that meets the temperature requirement for being sent to the downstream heat engine.

According to the temperature of the primary heating air 27 (measured by the first temperature sensor 12), the temperature of the hot air 17 (measured by the second temperature sensor 16), the temperature of the air for supplemental burning 18 (measured by the third temperature sensor 19), the flow rate and temperature of the cold air 25 (measured by the fourth temperature sensor 24), and the low calorific value of the fuel 22, the flow rates of the fuel 22 and the air for supplemental burning 18 can be calculated, respectively; according to the theoretical air-fuel ratio of the fuel 22, the flow rates of the first and second routes of air after the air for supplemental burning 18 enters the burner 20.

It can be seen that the burner 20 with the above structure can be excellently suitable for circumstances in which the air is used by a solar power generation system as the working fluid. The high temperature smoke gas after the fuel is burned can be directly mixed with the air and becomes a part of the working fluid, while no special heat exchanger is needed. Such a way enables the apparatus for heating a working fluid to have a relatively high photo-thermal conversion efficiency, result in a relatively high transport efficiency of fuel reaction heat, and can prevent the burner housing 38 from being burned, while being capable of completing the supplemental burning, thereby enhancing the operational stability of the burner 20 and extending its service life.

In a further solution, the above air introduction pipe may be disposed with a dividing hole 46, and the air introduction pipe 45 is open to the secondary air passage 43 and the inner cavity via the dividing hole 46. With such a dividing structure, it can easily achieve the division of the air for supplemental burning 18, and has characteristics of simple structure and convenient processing. Of course, the above dividing way is not limited to the form of the dividing hole 46. For example, the inner end of the air introduction pipe 45 may also be set to two pipes, these two pipes are open to the inner cavity and the secondary air passage 43, and it may also be other dividing ways.

Figure 3:
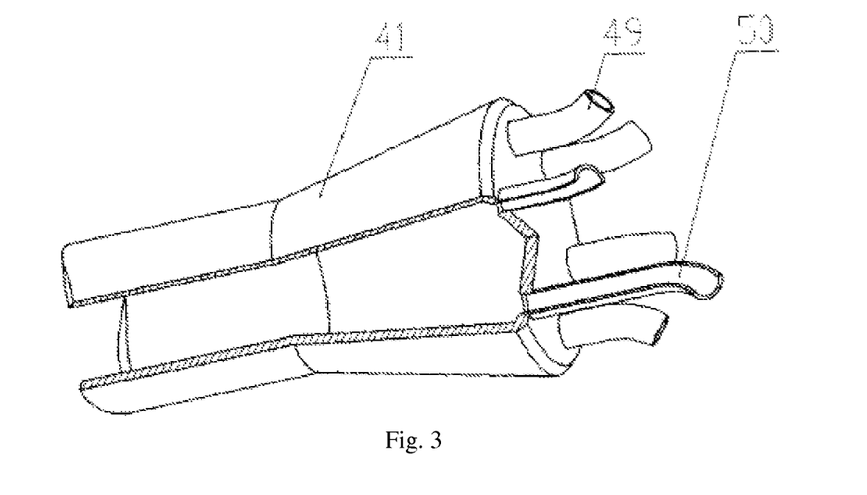
FIG. 3 is an axonometric view of the second embodiment of the burner head in FIG. 1.

With respect to the specific structure form of the burner head 41 of the above burner 20, as shown in FIG. 2, it may be a cylindrical structure with two ends open, its radius gradually increases from the fuel inlet to the fuel outlet, and a fire arrestor 42 is disposed inside the burner head 41. The burner head 41 with such a structure has a simple structure and is easy to be processed. Of course, the structure shown in FIG. 3 may also be used. FIG. 3 is an axonometric view of the second embodiment of the burner head 41 in FIG. 1, i.e. an end plate is disposed at the fuel outlet of the burner head 41, at least 3 fuel jet pipes 49 bending outwardly and an ignition pipe 50 are disposed on the end plate, and the ignition pipe 50 extends to the ignition plug 44 of the burner 20. The burner head 41 of such a structure may enhance the ignition performance when the burner 20 is turned on.

Figure 4:
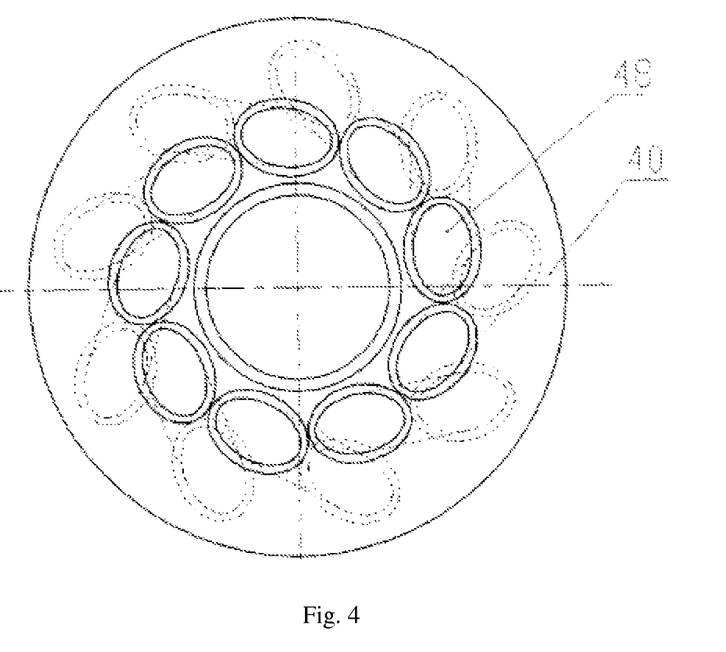
FIG. 4 is a front view of the first embodiment of the swirl nozzle in FIG. 1.
Figure 5:
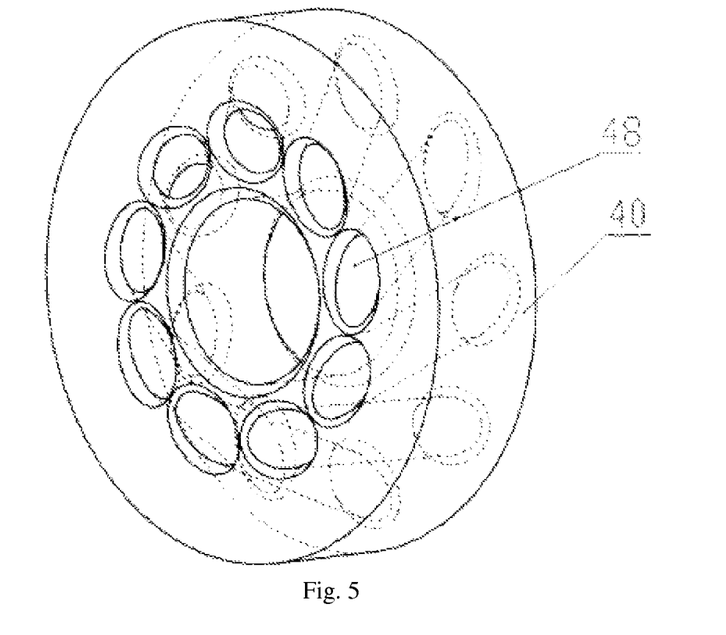
FIG. 5 is an axonometric view of FIG. 4.
Figure 6:
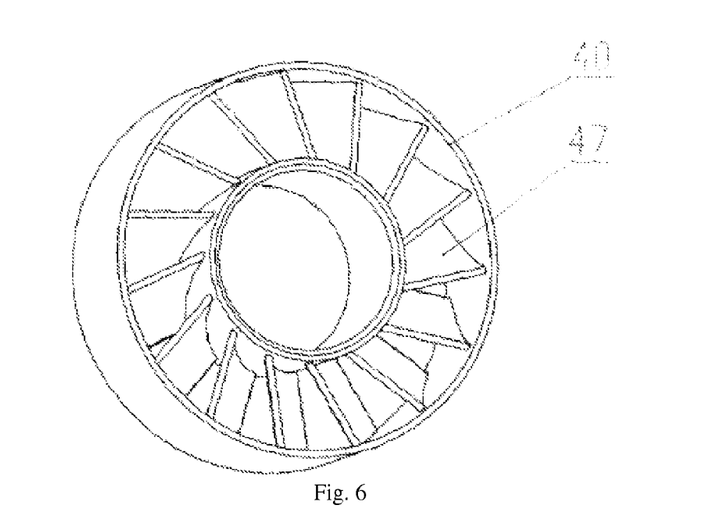
FIG. 6 illustrates the structure of the second embodiment of the swirl nozzle in FIG. 1.

With respect to the specific structure form of the swirl nozzle 40 of the above burner 20, FIG. 4, FIG. 5 and FIG. 6 may be referred to. FIG. 4 is a front view of the first embodiment of the swirl nozzle in FIG. 1; FIG. 5 is an axonometric view of FIG. 4; and FIG. 6 illustrates the structure of the second embodiment of the swirl nozzle in FIG. 1.

As shown in FIG. 4 and FIG. 5, the above swirl nozzle 40 may be of a structure that a plurality of guide holes 48 are evenly arranged therein, and the axes of the guide holes 48 and the axis of the swirl nozzle 40 are straight lines on different planes. In such a way, the air has a momentum in the tangential direction after flowing out of the swirl nozzle 40, a return flow zone is formed at the downstream of the burner head 41 such that a part of the burning high temperature gas returns in the return flow zone to ignite the subsequent combustible mixed gas and keep the burning stable and continuing. Of course, the above swirl nozzle may also use other structural forms, as shown in FIG. 6, for example, the above swirl nozzle 40 may use the structure with a plurality of airflow guide blades 47 therein, and the plurality of airflow guide blades 47 are disposed circumferentially along the swirl nozzle 40.

The specific structure form of the above heat collecting cavity 7 may be further set up. Please refer to FIG. 7, and FIG. 7 illustrates the structure of the primary heat absorbing body in FIG. 1.

Figure 7:
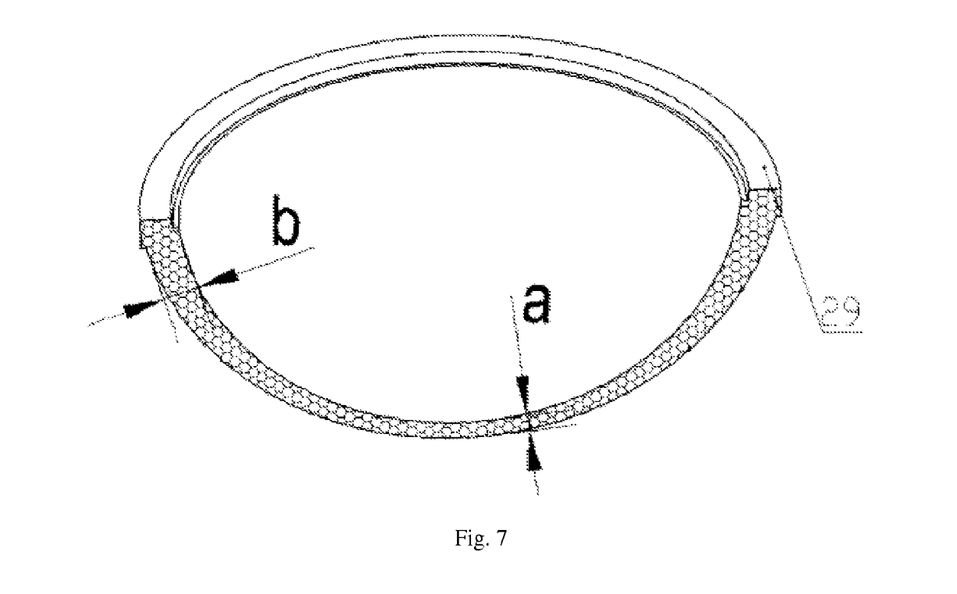
FIG. 7 illustrates the structure of the second embodiment of the primary heat absorbing body in FIG. 1.

In another embodiment, as shown in FIG. 7, the thickness of the above primary heat absorbing body 29 may gradually increase from the section a at the center to the sections b at both two sides. According to the distribution density of the sunlight 37 concentrated by the disk-shaped concentrating collector, it can be seen that for the primary heat absorbing body 29, the energy density is the highest at its central part, which gradually decreases along with the increasing radius. The primary heat absorbing body 29 is designed to have a thickness smaller at the center than the two sides, as shown in FIG. 7, the concentrated sunlight 37 has the shortest flow path in the central part, the smallest pressure loss, the highest infiltration rate, the highest heat convection coefficient, and better coordination with the solar energy distribution density, thereby achieving the best absorption effect.

Of course, the structural form of the above primary heat absorbing body 29 is not limited to the above structure. The porosity of the primary heat absorbing body 29 may also be set to decrease along with the increasing thickness such that even the flow path is the same for the concentrated sunlight 37, the same technical effect may still be achieved since the pressure loss per unit flow path is inversely proportional to the porosity.

It should be particularly noted that both of the above primary heat absorbing body 29 and secondary heat absorbing body 33 may employ heat-resistant porous medium materials, such as high temperature-resistant foam ceramics, which can make the air temperature rise to above 700 degrees, such that the photo-thermal conversion efficiency and heat transfer efficiency of the apparatus for heating a working fluid can be improved, which is suitable for mid to high temperature applications of solar power and has relatively good matching capability with the high concentration ratio performance of disk-shaped concentration devices.

Other specific structural forms of the above apparatus for heating a working fluid may be further set up.

In an embodiment, a cooling jacket 3 may be disposed at the front side of the above front end plate 35, the cooling jacket 3 is equipped with a cooling liquid flowing cavity 4, and a first connector 34 and a second connector 2 for the cooling liquid 1 to flow in and out are disposed on the two sides of the cooling liquid flowing cavity 4, respectively.

With such a structure, during the operation of the apparatus for heating a working fluid, the concentrated sunlight 37 enters the heat collecting cavity 7. Since there is a lot of air space inside the porous medium of the primary heat absorbing body 29, leading to a very high degree of darkness, the concentrated sunlight 37 is immediately absorbed once it is projected to the surface thereof and converted to thermal energy; due to reasons in manufacturing precision, wind blowing, stress deformation, etc., however, the reflection surface of the disk-shaped concentrating collector may deviate from the theoretical design position. Consequently, a part of the concentrated sunlight 37 is unable to enter the heat collecting cavity 7 through the light collection holes. Instead, it falls on the front end plate 35 of the heating apparatus such that it is burned. With the installation of the cooling jacket 3, the cooling liquid 1 enters the cooling liquid flowing cavity 4 through the first connector 34, and when it absorbs the heat of the front end plate 35, the cooling liquid 1 flows out from the second connector 2, thereby ensuring the operational stability and reliability of the heating apparatus.

The specific method of connection between the above burner 20 and the supplemental heating section 13 may be further set up.

Figure 8:
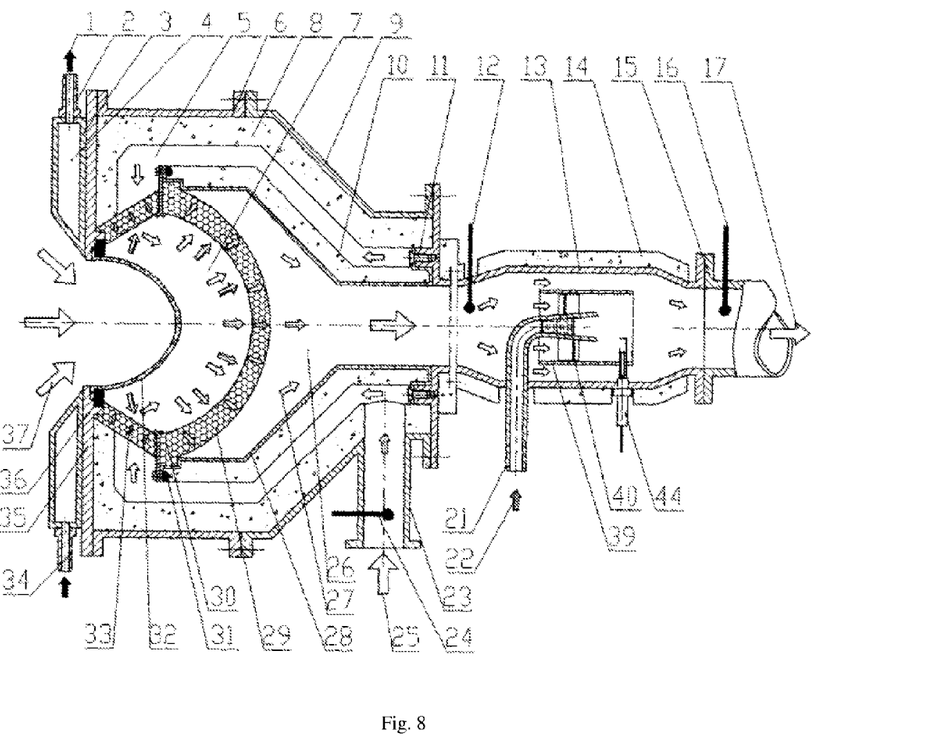
FIG. 8 illustrates the structure of another embodiment of the apparatus for heating a working fluid of a gas turbine-solar power generation system according to the present invention.
Figure 9:
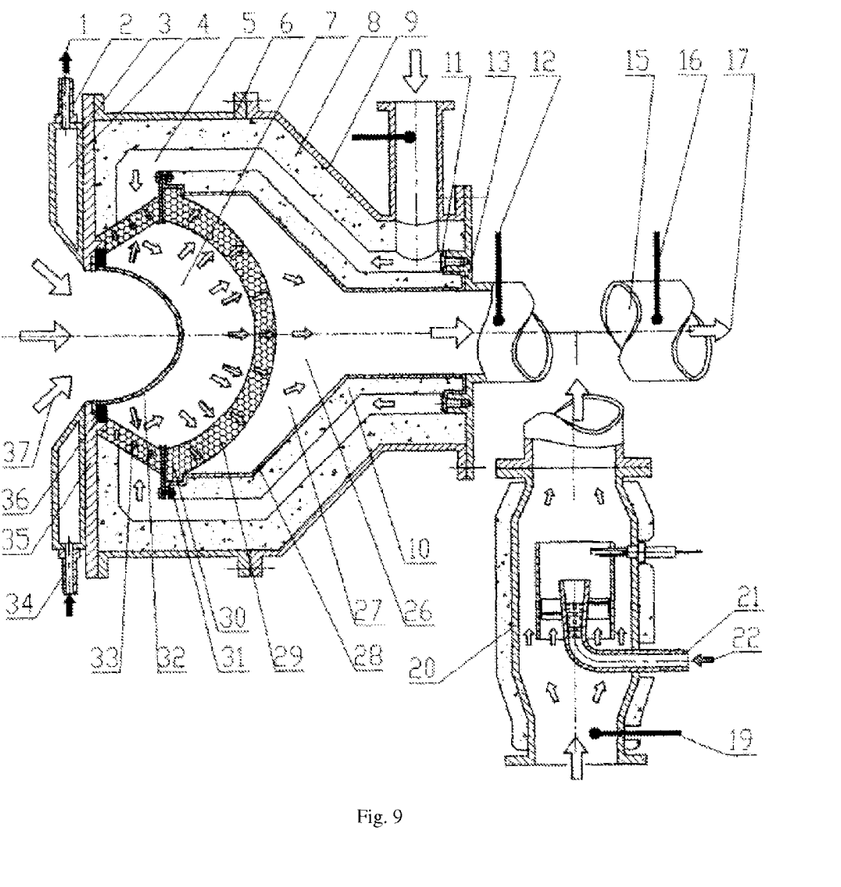
FIG. 9 illustrates the structure of the third embodiment of the apparatus for heating a working fluid of a gas turbine-solar power generation system according to the present invention.

Please refer to FIG. 1, FIG. 8 and FIG. 9. FIG. 8 illustrates the structure of another embodiment of the apparatus for heating a working fluid of a gas turbine-solar power generation system according to the present invention; FIG. 9 illustrates the structure of the third embodiment of the apparatus for heating a working fluid of a gas turbine-solar power generation system according to the present invention.

In a specific solution, the above burner 20 may be fixedly connected to the supplemental heating section 13. As shown in FIG. 1, for example, the burner 20 may be fixedly connected to the bottom of the supplemental heating section 13. At this time, the above divided burning method is used. Of course, it may also be as shown in FIG. 8, the burner 20 is disposed inside the supplemental heating section 13, the fuel 22 heating part is connected in series with the solar power heating part, and at this time, the air introduction pipe 45 may be removed, the third temperature sensor 19 is correspondingly removed, and the ignition plug 44 is directly installed on the housing of the supplemental heating section 13. At this time, when the first temperature sensor 12 detects that the temperature of the primary heating air 27 is not high enough, the burner 20 is turned on to work, the oxygen for the burning is directly from the primary heating air 27, and the heat from the burning of the fuel 22 directly heats up the primary heating air 27 to form the hot air 17 that meets the requirements for output. According to the temperature of the first temperature sensor 12, the temperature of the second temperature sensor 16, and the flow rate and temperature of the cold air 25, as well as the minimum calorific value of the fuel 22, the flow rate of the fuel 22 can be similarly calculated at this time.

Of course, the above burner 20 and the supplemental heating section 13 are not limited to the fixed connection. The structure shown in FIG. 9 may also be used, namely the burner 20 and the supplemental heating section 13 are in a detachable structure, in which the two are detachably connected. With this structure, the high temperature smoke gas produced by the burner 20 is mixed into the primary heating air 27 via pipeline until the hot air 17 that meets the predetermined requirements by the second temperature sensor 16 is produced, which is then transferred to the downstream heat engine. With such a structure, the apparatus for heating a working fluid has features of easy installation and simple disassembly.

It should be particularly noted that the technical effect of the above apparatus for heating a working fluid is described only with the disk-shaped gas turbine-solar power generation system as example. In fact, the above apparatus for heating a working fluid is not limited to applications on disk-shaped gas turbines, but can also be applied in other gas turbine-solar power generation systems, such as tower gas turbine-solar power generation systems, etc.

The apparatus for heating a working fluid of a gas turbine-solar power generation system according to the present invention is described in detail above. Specific examples are used herein to describe the principle and embodiments of the present invention. The description of the above examples is only intended to help understand the methods and core thinking of the present invention. It should be noted that to those skilled in the art, a number of modifications and improvements can be made without departing from the principle of the present invention, which shall all be encompassed by the protection scope of the present invention.

The invention claimed is:

1. An apparatus for heating a working fluid of a gas turbine-solar power generation system, comprising a cold air flow channel, a heat collecting cavity, and a hot air passage that defines a hot air flow path that are sequentially connected, the cold air flow channel is formed between an internal insulation layer and an external insulation layer, the heat collecting cavity is formed by a primary heat absorbing body and a secondary heat absorbing body, the hot air passage is formed by connecting an inner housing on the front side to a supplemental heating section on the rear side, the heat collecting cavity is separated from the cold air flow channel by the secondary heat absorbing body and separated from the hot air passage by the primary heat absorbing body; characterized in that the apparatus further comprises a gas burner for heating a primary heating air within the supplemental heating section when solar power is insufficient, and the burner is arranged at the supplemental heating section within a burner housing which defines a cavity through which supplemental heated air flows along a supplemental air flow path, the cavity is offset from the hot air flow path so that the supplemental air flow path is transverse to the hot air flow path and is in fluid communication therewith.

2. The apparatus for heating a working fluid of a gas turbine-solar power generation system as set forth in claim 1, characterized in that:
   a burner head of the burner is fitted with a swirl nozzle, the swirl nozzle is equipped externally with a guide sleeve,
   the burner head, the swirl nozzle and the guide sleeve form an inner cavity,
   the burner housing and the guide sleeve form a secondary air passage, and
   the secondary air passage and the inner cavity are both open to the hot air passage; the burner is further equipped with an air introduction pipe that is open to the secondary air passage and the inner cavity.

3. The apparatus for heating a working fluid of a gas turbine-solar power generation system as set forth in claim 2, characterized in that the air introduction pipe is equipped with dividing holes, and the air introduction pipe is open to the secondary air passage and the inner cavity via the dividing holes.

4. The apparatus for heating a working fluid of a gas turbine-solar power generation system as set forth in claim 3, characterized in that the collecting cavity is further formed by a glass cover, and the primary heat absorbing body has a thickness that gradually increases from the center to two sides.

5. The apparatus for heating a working fluid of a gas turbine-solar power generation system as set forth in claim 3, characterized in that a cooling jacket is disposed at a front side of a front end plate, the cooling jacket is equipped with a cooling liquid flowing cavity, and a first connector and a second connector for the cooling liquid to flow in and out are disposed on the two sides of the cooling liquid flowing cavity, respectively.

6. The apparatus for heating a working fluid of a gas turbine-solar power generation system as set forth in claim 2, characterized in that an end plate is disposed at a fuel outlet of the burner head, at least 3 fuel jet pipes bending outwardly and an ignition pipe are disposed on the end plate, and the ignition pipe extends to an ignition plug of the burner.

7. The apparatus for heating a working fluid of a gas turbine-solar power generation system as set forth in claim 2, characterized in that the swirl nozzle has a plurality of guide holes that are evenly arranged therein, and the axes of the guide holes and the axis of the swirl nozzle are straight lines on different planes.

8. The apparatus for heating a working fluid of a gas turbine-solar power generation system as set forth in claim 2, characterized in that the collecting cavity is further formed by a glass cover, and the primary heat absorbing body has a thickness that gradually increases from the center to two sides.

9. The apparatus for heating a working fluid of a gas turbine-solar power generation system as set forth in claim 2, characterized in that a cooling jacket is disposed at a front side of a front end plate, the cooling jacket is equipped with a cooling liquid flowing cavity, and a first connector and a second connector for the cooling liquid to flow in and out are disposed on the two sides of the cooling liquid flowing cavity, respectively.

10. The apparatus for heating a working fluid of a gas turbine-solar power generation system as set forth in claim 2, wherein the air introduction pipe extends through a sidewall of the burner housing and connects to the guide sleeve so as to be in fluid communication with the interior of the guide sleeve.

11. The apparatus for heating a working fluid of a gas turbine-solar power generation system as set forth in claim 10, wherein a plurality of dividing holes extend through the air introduction pipe and are disposed within the secondary air passage between the burner housing and guide sleeve.

12. The apparatus for heating a working fluid of gas turbine-solar power generation system as set forth in claim 11, wherein the burner head is disposed at an end of a fuel feeding pipe and includes an end plate, an ignition pipe and at least one fuel jet pipe, the burner head has a diameter that gradually increases from the fuel feeding pipe to the end plate, the fuel jet pipe and ignition pipe extend from the end plate and are in fluid communication with the interior of the burner head, and the ignition pipe extends to an ignition plug that is disposed downstream of the burner head and within the burner housing.

13. The apparatus for heating a working fluid of a gas turbine-solar power generation system as set forth in claim 1, characterized in that the collecting cavity is further formed by a glass cover, and the primary heat absorbing body has a thickness that gradually increases from the center to two sides.

14. The apparatus for heating a working fluid of a gas turbine-solar power generation system as set forth in claim 1, characterized in that a cooling jacket is disposed at a front side of a front end plate, the cooling jacket is equipped with a cooling liquid flowing cavity, and a first connector and a second connector for the cooling liquid to flow in and out are disposed on the two sides of the cooling liquid flowing cavity, respectively.

15. The apparatus for heating a working fluid of a gas turbine-solar power generation system as set forth in claim 1, characterized in that the burner is fixedly connected to the supplemental heating section.

16. The apparatus for heating a working fluid of a gas turbine-solar power generation system as set forth in claim 1, characterized in that the burner and the supplemental heating section form a detachable structure in which the two are detachably connected.

17. The apparatus for heating a working fluid of a gas turbine-solar power generation system as set forth in claim 1, characterized in that the cold air flow channel is ring-shaped and the internal insulation layer is disposed between the hot air passage and the cold air flow channel.

18. The apparatus for heating a working fluid of gas turbine-solar power generation system as set forth in claim 1, characterized in that the burner is fixedly connected to the bottom of the supplemental heating section.

19. The apparatus for heating a working fluid of gas turbine-solar power generation system as set forth in claim 1, wherein the burner is offset from the hot air flow path.

20. The apparatus for heating a working fluid of gas turbine-solar power generation system as set forth in claim 1, wherein the hot air flow passage is defined by inner surfaces of the inner housing and the supplemental section, and the burner housing is recessed within the inner surface of the supplemental heating section.

* * * * *